United States Patent
Schmid et al.

[11] Patent Number: 5,438,973
[45] Date of Patent: Aug. 8, 1995

[54] SHAPED BLADES

[75] Inventors: Frederick Schmid, Marblehead;
Maynard B. Smith, Amesbury;
Chandra P. Khattak, Danvers, all of Mass.

[73] Assignee: Crystal Systems, Inc., Salem, Mass.

[21] Appl. No.: 133,602

[22] Filed: Oct. 8, 1993

[51] Int. Cl.6 ............................................. B28D 1/00
[52] U.S. Cl. ...................................... 125/18; 125/22; 451/547
[58] Field of Search .................... 125/15, 18, 21, 22, 125/12, 13; 451/541, 547, 548

[56] References Cited
U.S. PATENT DOCUMENTS

| | | | |
|---|---|---|---|
| 2,924,050 | 2/1960 | Barron | 125/21 |
| 3,162,187 | 12/1964 | Christensen | 125/15 |
| 3,626,921 | 12/1971 | Lane | 125/15 |
| 4,187,828 | 2/1980 | Schmid | 125/18 |
| 4,384,564 | 3/1983 | Smith et al. | 125/21 |

*Primary Examiner*—Maurina T. Rachuba
*Attorney, Agent, or Firm*—Hale and Dorr

[57] ABSTRACT

A cutting blade the core of which is generally tear-drop shaped in cross-section. The sides of the tear-drop shaped core form an included angle of not less than about 5 degrees (and typically not less than about 9 degrees), and abrasive is provided essentially on only the wide bottom surface of the core.

21 Claims, 2 Drawing Sheets

SHAPED BLADES

FIELD OF THE INVENTION

This invention relates to shaped blades and, more particularly, to blades for slicing brittle materials such as silicon, GaAs, CdTe, $MgF_2$, PET, etc.

BACKGROUND OF THE INVENTION

In slicing wafers from silicon, etc., bars or rods for use in, for example, the electronics, optical or photovoltaic industry, two principal costs are the cost of the material or ingot itself, and the cost (including material yield) of cutting the ingot into wafers. It is desirable to decrease the latter by minimizing the amount of material lost during cutting, and maximizing cutting speed and blade life.

In the past, wafer yield has been increased by using blades in which abrasive particles are attached (typically by plating) on only the cutting edges. Blade life has been improved by reducing abrasive particle pull-out. These improvements are discussed in U.S. Pat. Nos. 4,187,828 and 4,384,564, both assigned to the assignee of this application.

However, kerf loss remains significant. When, for example, the desired wafer thickness is about 300 μm, it has proved difficult to achieve better than about 60% material utilization; and a wide kerf width also results in reduced cutting speed. Conventional rectangular in cross-section blades require abrasive that extends well beyond the sides of the blade to provide the necessary relief. Circular cross-section blades require less relief, but tend to wander and twist and their smaller cross-section also limits the feed force that may be employed. For example, slicing tests using the Fixed Abrasive Slicing Technique (FAST; see F. Schmid, M. B. Smith and C. Khattak in *Proceedings of 23rd Photovoltaic Specialists Conference,* in Louisville, Ky., USA, May 1993, p. 205) showed that reduction of wire size below 200 μm diameter caused excessive wander due to reduction of tension forces resulting from decreasing cross-sectional area, and that 200 μm wire, plated with 45 μm diamond abrasive, resulted in an approximately 300 μm kerf.

SUMMARY OF THE INVENTION

The present invention provides a blade configuration that reduces kerf width while, at the same time, results in increased cutting pressure, higher speed with reduced wander, and longer blade life.

In a first aspect, the invention features a blade, the core of which is generally tear-drop shaped in cross-section. In preferred embodiments, the sides of the "teardrop" form an included angle of about 9 degrees, the blade height is not less than about one and one-half times (and most preferably about twice) the blade width, and abrasive is provided essentially on only the wide cutting surface of the "tear-drop."

A second aspect of the invention features manufacturing such a blade by an electroforming process in which a stainless steel wire core of tear-drop cross-section is supported in a groove in a non-conductive form. The form engages the sides of the blade core while exposing the wider surface, and permits an abrasive cutting portion to be plated onto essentially only the exposed outer surface of the core.

These and other features and advantages of the present invention will become apparent from the following detailed description embodiments and accompanying drawings.

DETAILED DESCRIPTION OF PREFERRED EMBODIMENT

Figure 1:
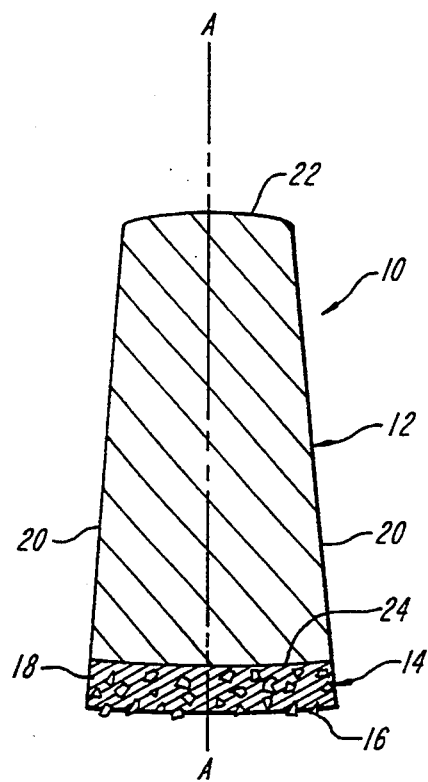
FIG. 1 is a cross-section of a wire embodying the present invention.

Referring to FIG. 1, there is shown a blade 10 including a teardrop-shaped stainless steel core 12 having a cutting portion 14 consisting of diamond abrasive particles 16 fixed in nickel plating 18. The blade and core are symmetrical about their central axis A—A. The overall height and width of the blade 10 are, respectively, about 300 μm (about 0.012 in.) and about 140 μm. (about 0.0055 in.). The two flat side surfaces 20 of the blade are aligned in planes that form an about 9 degree angle with each other, and are joined by curved in cross-section top and bottom surfaces, designated 22 and 24 respectively. The width, i.e., the chord of the arc, of the top, non-cutting surface 22 of the blade is about 100 μm (about 0.004 in.). The blade surface 24 to which the cutting portion 14 is affixed defines the maximum width, about 135 μm (about 0.0053 in.) in the illustrated embodiment, of the overall blade core. In the illustrated embodiment, cutting portion 14 is about 35 μm (about 0.0014 in) thick, and adds only about 5 μm (about 0.0002 in.) to the overall width of the blade 10.

The desired generally tear-drop shaped core 12 may be formed in a number of ways. Preferably, it is produced by drawing rectangular in cross-section stock (having an overall height and width substantially equal to the desired overall dimensions of the core) through a die or series of dies of the desired cross-sections. It may also be produced by flattening, followed by further rolling to achieve the desired angle.

The cross-section of the core 12 may vary significantly from that shown. For example, the side surfaces 20 may be slightly bowed rather than flat, and in lieu of the 9 degree divergence of the preferred embodiment the angle between the sides may vary from as little as about 5 degrees to as much as about 20 degrees.

The minimum angle between the sides 20 of the blade core should be sufficient to avoid having to provide a cutting portion that is significantly wider than the blade, as is required in the case of rectangular blades to provide the required relief. Also, the cutting machines with which blades of the present invention are typically used have guide rollers with circumferential V-shaped grooves in which the wire blades are seated. The blade and groove angles should be the same to provide stable support for the blade, but it is difficult to cut narrow grooves in which the included angle is very small. A small included angle and high aspect ratio results in a large contact surface between the blade and guide roller resulting in improved guidance.

The maximum angle depends principally on the desired overall blade cross-section and maximum blade width. Additionally, a relatively narrow blade and support groove angle provide more stable support.

In any event, the blade core should have a height greater than (e.g., in the range of about one and a half times to three times and, typically, about twice) its overall width, diverging sides and a cutting surface wider than the non-cutting surface on the opposite side of the blade, and should be symmetrical about its central axis.

In making shaped blades 10, the cores 12 are first fixed between two clamps 48 as described in U.S. Pat. No. 4,178,760, and abrasive cutting portion is then plated onto surface 24 of the cores using an electroforming procedure generally as described in U.S. Pat. No. 4,384,564. Both of these patents are hereby incorporated by reference.

Figure 2:
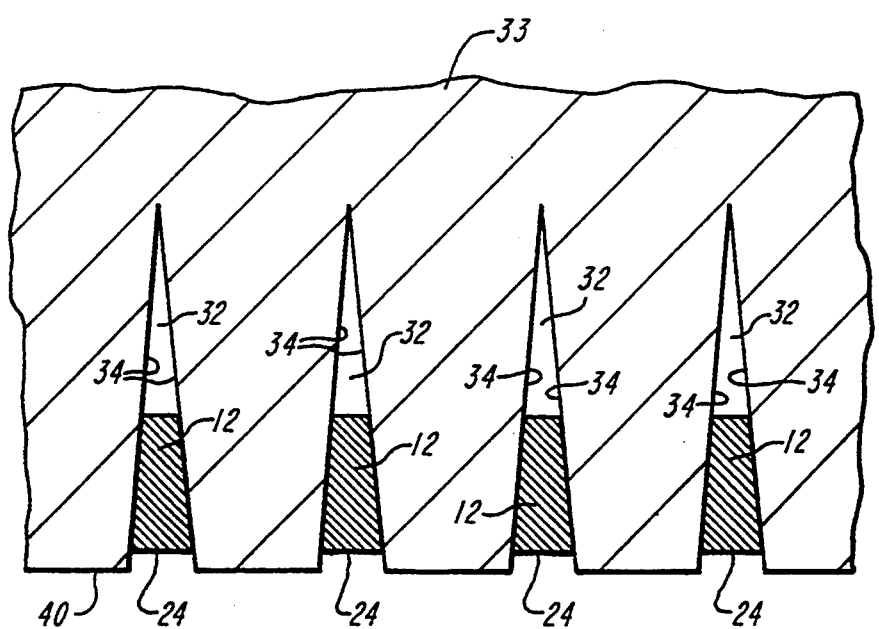
FIG. 2 is a cross-section of a plating form used in the manufacture of the wire of the present invention.

As shown in FIG. 2, and generally described in U.S. Pat. No. 4,384,564, the cores 12 are seated in grooves 32 of a non-conductive form 33, e.g., a form made of a tetrafluroethylene or tetrafluroethylene-based polymer, on which there will be no plating. Each groove 32 has a pair of spaced-apart tapering side wall surfaces 34 that define an included angle equal to that defined by the flat side surfaces 20 of wire core 12, in the preferred embodiment 9 degrees. As will be apparent in FIG. 2, the width of each groove 32 is such that a wire core 12 thus fits within the groove, with the surface 24 of the core positioned within the outer surface 40 of the form. The distance from the outer surface 40 of the form to the core surface 24 should be slightly more than the intended thickness of the cutting portion 14 to be plated onto surface 24.

Figure 3:
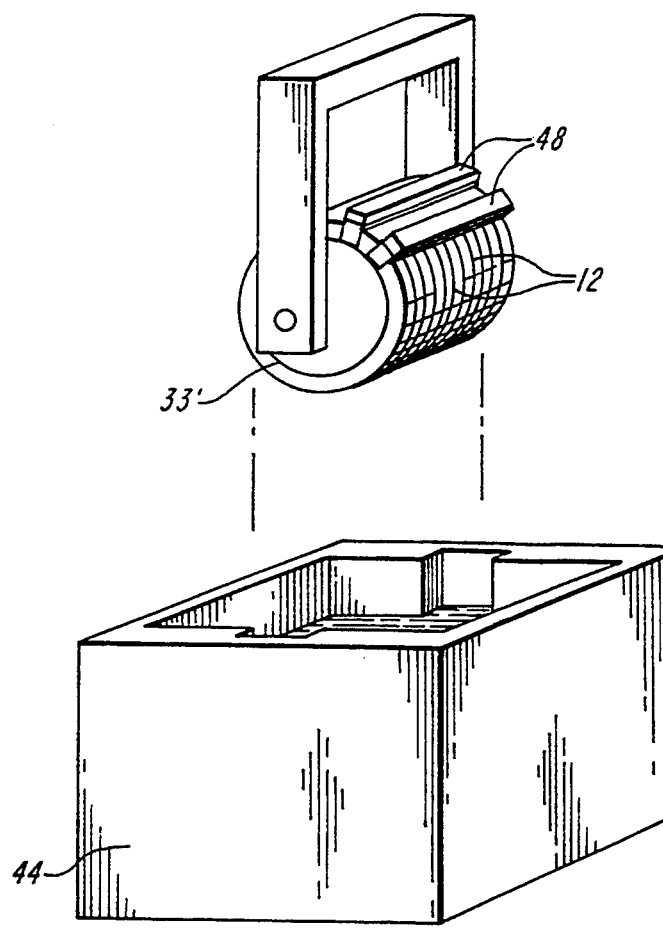
FIG. 3 is a diagrammatic perspective view of a cylindrical form with wires in its grooves about to be immersed into a plating solution.
Figure 4:
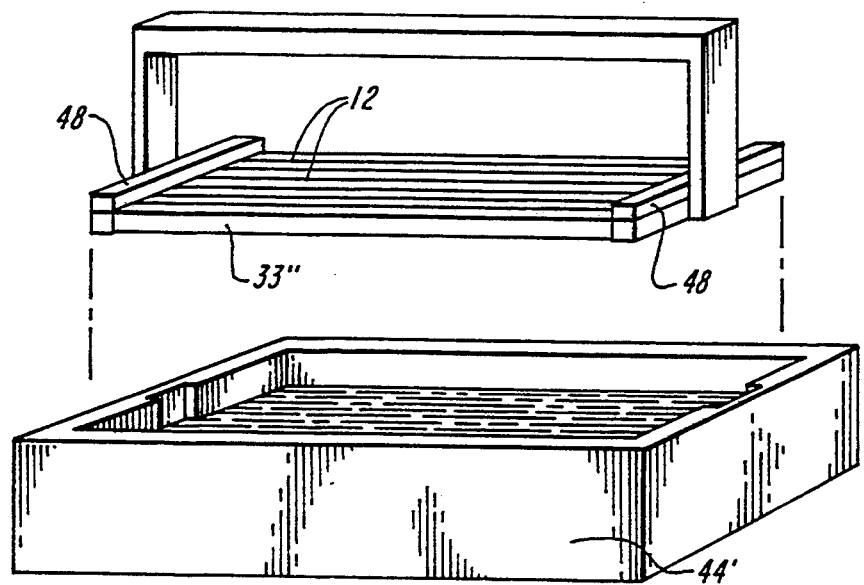
FIG. 4 is a diagrammatic perspective view of a flat grooved form with wires in its grooves about to be immersed in a plating solution.

As discussed in U.S. Pat. No. 4,384,564, the form used may be either a cylindrical grooved form 33' (as shown in FIGS. 2 and 3), or, and preferably, a flat grooved form 33" (as shown in FIG. 4). In either event, wire cores 12 are seated in the grooves 32 of the form, the form and wire cores are immersed in a plating solution 44, 44', e.g., a nickel plating solution in which diamond abrasive particles are suspended. When a flat form is used, as in FIG. 4, the form 33" is typically bowed to place the cores under tension.

Cutting portion 14, which includes diamond abrasive particles suspended in nickel, is then electroplated onto the exposed surface 24 of each core.

It will be seen that the overall width of cutting portion 14 is limited by the distance between the side walls 34 of grooves 32. Since the angle between the side walls of the grooves 32 is small, a relatively thick cutting portion 14 may be plated onto surface 24 without greatly increasing the overall width of the blade 10. For example, in the preferred embodiment in which the angle is about 9 degrees, a cutting portion 14 about 35 μm (about 0.0014 in.) thick will increase the overall blade width by only about 5 μm (only about 0.0002 in.).

Because the form 33 is made of non-metallic material, there is no plating onto its surfaces. Similarly, there is no plating onto the side surfaces 20 or surface 22 of the wire cores because these surfaces are shielded by the form.

Other embodiments will be within the scope of the following claims.

What is claimed is:

1. A wire blade comprising a longitudinally-extending core and abrasive affixed to a longitudinally-extending portion of the outer surface of the core, the blade being characterized in that, in transverse cross-section, the core includes a pair of longitudinally and downwardly extending, diverging side surfaces, and said longitudinally extending portion of said outer surface extends between the diverging side surfaces a distance substantially equal to the maximum width of said core and defines an edge of said core.

2. The blade of claim 1 wherein said core is generally tear-drop shaped in cross-section and includes a second longitudinally extending surface on the side of said core opposite said abrasive, said second surface extending between said side surfaces a distance substantially equal to the minimum width of said core and defining a second edge of said core.

3. The blade of claim 1 wherein said core is symmetrical about a longitudinally-extending plane intermediate said side surfaces.

4. The blade of claim 1 wherein the said surface portion to which said abrasive is affixed is outwardly convex.

5. The blade of claim 1 wherein abrasive particles are affixed to said surface portion by plating.

6. The blade of claim 1 wherein the angle between said side surfaces is not less than about 5 degrees.

7. The blade of claim 6 wherein said angle is in the range of about 5 to about 20 degrees.

8. The blade of claim 7 wherein said angle is about 10 degrees.

9. The blade of claim 1 wherein the overall height of said blade core is not less than about one and one-half times the maximum width of said blade core.

10. The blade of claim 9 wherein said overall height is in the range of about one and one-half to about three times the maximum width of said blade core.

11. The blade of claim 9 wherein said overall height is about twice said maximum width.

12. The blade of claim 1 wherein said abrasive is plated onto substantially only said edge of said core and defines a blade cutting surface.

13. The blade of claim 10 wherein said blade cutting surface has a width not more than about 20 μm greater than the maximum width of said core.

14. The blade of claim 11 wherein said blade cutting surface has a width about 5 μm greater than the maximum width of said core.

15. The blade of claim 1 wherein the overall height of said core is not more than about 300 μm and the overall width of said core is not more than about 150 μm.

16. In a process for electroforming an abrasive cutting layer on a metal blade core, that improvement comprising the steps of:
  providing a said blade core that is generally tear-drop shaped in cross-section and has a pair of spaced apart side walls that diverge from each other at an angle in the range of about 5 to about 20 degrees;
  providing an electrically non-conducting form having therein a groove having converging side surfaces that form an angle substantially congruent to the angle of said blade core;
  placing said blade core in said groove such that said blade core is fully within said groove and the outer surface of said core is within the outer surface of said form; and,
  electroplating a layer including abrasive particles onto said outer surface of said core.

17. The process of claim 16 including the step of electroplating said layer onto said groove to a thickness such that said layer is fully within said groove and the sides of said groove limit the overall width of said layer.

18. The process of claim 16 wherein said layer has a maximum width not more than about 20 μm greater than the width of said outer surface.

19. The process of claim 18 wherein said maximum width is not more than about 5 μm greater than the width of said outer surface.

20. The process of claim 16 wherein the height of said core measured in a distance generally perpendicular to said outer surface is in the range of about 1.5 to about 3 times the width of said outer surface.

21. The process of claim 20 wherein said height is about twice said width.

* * * * *